United States Patent
Blum et al.

(10) Patent No.: US 6,586,521 B2
(45) Date of Patent: *Jul. 1, 2003

(54) AQUEOUS DISPERSIONS CONTAINING A MIXTURE OF COPOLYMERS AND THEIR USE IN BINDERS

(75) Inventors: Harald Blum, Leverkusen (DE); Wieland Hovestadt, Erftstadt (DE); Karl Ludwig Noble, Bergisch Gladbach (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,882

(22) Filed: Mar. 19, 1999

(65) Prior Publication Data

US 2001/0056154 A1 Dec. 27, 2001

(30) Foreign Application Priority Data

Mar. 30, 1998 (DE) .......................... 198 14 061

(51) Int. Cl.$^7$ .................. C08L 33/04; C08F 265/06; C08F 285/00; C08F 263/04; C08G 18/63
(52) U.S. Cl. .................. 524/522; 524/501; 524/523; 525/124; 525/125; 525/194; 525/220; 525/221; 525/223
(58) Field of Search .................. 525/192, 220, 525/223, 227, 191, 221, 228, 229, 231, 194, 124, 125; 524/515, 522, 523, 524, 501

(56) References Cited

U.S. PATENT DOCUMENTS

| 4,151,143 A | 4/1979 | Blank et al. ........ 260/29.6 RW |
| 4,413,037 A | 11/1983 | Tobias ................ 428/461 |
| 4,801,653 A | 1/1989 | Das et al. ............ 525/286 |
| 4,983,371 A | 1/1991 | Pitzer et al. ......... 423/344 |
| 5,438,099 A | 8/1995 | Fischer et al. ....... 525/67 |
| 5,670,600 A | 9/1997 | Nienhaus et al. ..... 528/75 |
| 5,876,802 A | 3/1999 | Brunnemann et al. .. 427/409 |

FOREIGN PATENT DOCUMENTS

| CA | 2090144 | | 8/1993 | |
| CA | 2182757 | * | 2/1997 | .......... C08L/33/06 |
| JP | 4001254 | | 1/1992 | |
| WO | WO-9706197 | * | 2/1997 | .......... C08G/18/62 |

* cited by examiner

*Primary Examiner*—Kelechi Egwim
(74) *Attorney, Agent, or Firm*—Joseph C. Gil; Thomas W. Roy

(57) ABSTRACT

Aqueous solutions or dispersions of copolymers A) a process of making them and their use in binder compositions. Copolymers A) containing a hydroxy-functional, hydrophobic copolymer I) containing 30 to 85% by weight of (meth) acrylic acid esters having $C_1$ to $C_{18}$ hydrocarbon radicals in the alcohol portion, aromatic vinyl compounds and/or vinyl esters and 5 to 45% by weight of hydroxy-functional monomers; a hydroxy- and carboxy-functional, hydrophilic-hydrophobic copolymer II) containing 4 to 20% by weight of (meth)acrylic acid esters having $C_1$ to $C_{18}$ hydrocarbon radicals in the alcohol portion, aromatic vinyl compounds and/or vinyl esters, 4 to 15% by weight of hydroxy-functional monomers and 0.8 to 3.0% by weight of acid-functional monomers; and optionally a hydroxy-functional hydrophobic copolymer III) containing 0 to 16% by weight of hydroxy- and/or non-functional (meth)acrylic acid esters or aromatic vinyl compounds, wherein 1) the sum of Ia), Ib), IIa), IIb) IIc) and IIIa) is 100%, based on the weight of these components, 2) copolymers A) have an acid number, based on solids, of 10 to 28 mg KOH/g substance, 3) the weight percent of monomers IIc) in monomer II) is less than 25% by weight and 4) the weight percent of hydroxy-functional monomers IIb) in copolymer II) is higher than the weight percent of hydroxy-functional monomers Ib) in copolymer I).

11 Claims, No Drawings

AQUEOUS DISPERSIONS CONTAINING A MIXTURE OF COPOLYMERS AND THEIR USE IN BINDERS

BACKGROUND OF THE INVENTION

1. Field of the Invention

The present invention relates to aqueous copolymer dispersions, which can be cured by various crosslinking resins, to a method of producing these dispersions and to their use in binders.

2. Description of the Prior Art

It is known from a various publications that dispersions based on copolymers can be used in water-thinnable lacquers and coating compositions. For example, EP-A-225,612 and DE-A-3,543,361 describe physically drying polymer dispersions which are produced by a two-stage polymerization process, wherein monomers containing carboxyl groups are used in only one of the two polymerization stages.

So that coatings produced from these dispersions exhibit good resistance to water, ammonia is used in the production thereof. Additions of other neutralizing agents impair the water resistance of coatings and films prepared therefrom. Monomers containing hydroxyl groups are not used, since they can have an unfavorable effect on the resistance to water.

Methods of producing multi-layer coatings are described, e.g., in EP-A-363,723, DE-A-4,009,858, DE-A-4,009,931, EP-A-521,919, DE-A-4,009,932 and EP-A-365,775. A base coat is first applied from which a polymer film is formed. A top coat is then applied and the base coat is then applied and the base coat and top coat are subsequently stoved together. Copolymer dispersions which are produced by a two-stage production process, optionally in combination with aminoplast resins, may be used for the base coat or top coat. Higher coating thicknesses and good visual properties of the films can be obtained by the use of these special copolymer dispersions. A disadvantage of all these dispersions, however, is the high proportion of carboxyl-functional monomers in the hydrophilic copolymer constituent.

JP-A-80/82 166 describes polyacrylate dispersions which are produced by a two-stage process. Starting materials containing carboxyl groups are used in both stages of their production. This results in dispersions with relatively low solids contents. The resulting coatings exhibit a reduced resistance to water.

U.S. Pat. No. 4,151,143 describes polyacrylate dispersions which are produced by a two-stage process, wherein the first stage is produced in organic solution, is subsequently dispersed, and an emulsion polymerization is effected as the second stage in the presence of the first stage. The resulting products have high molecular weights, but exhibit unsatisfactory film formation when used in coating compositions, and overall exhibit properties which differ from those of customary secondary dispersions.

EP-A-557,844 describes aqueous two-component polyurethane coatings which are stabilized by the addition of external emulsifiers and which are based on hydrophilic polyisocyanates and emulsion copolymers which are practically free from carboxylate groups. Due to the high molecular weights of the polymers and the permanent hydrophilic properties of the emulsifiers added, these coating compositions are still deficient with regard to their resistance to water, pigment wetting and film appearance for some applications.

EP-A-358,975 describes aqueous two-component polyurethane compositions which exhibit good properties. For some applications, however, an improvement in their solids content, resistance to water, processing time or reliability of application is needed.

DE-A 4,439,669, DE-A 4,322,242 and JP-A 04001254 describe aqueous two-component polyurethane compositions which are based on copolymers containing special monomers and can be produced by a two-stage process. These special monomers are claimed to impart improved properties to coatings produced therefrom, but result in products which are considerably more costly so that the possibilities of using them economically are limited.

From the multitude of patent applications in the field of polymer dispersions, it is apparent that there is a continuing need for improved products in order to satisfy the increasing demands being made on lacquers or coatings. In particular, dispersions are required which are capable, due to reactive groups, of being cured by suitable crosslinking agents at low temperatures, preferably at room temperature, to form high-quality coatings.

Dispersions which are advantageous from an economic and application technology point of view are those which have a high solids content and excellent stability on storage, both as a dispersion and in a lacquer. A very good capacity for pigmentation, for example, is necessary for systems such as these, and this has a considerable effect on the excellent film appearance which is required. The lacquer films must exhibit very good resistance to solvents, water and environmental effects.

It is an object of the present invention to provide aqueous dispersions that can be used in as many application areas as possible and that exhibit good compatibility with as many commercially available crosslinking agents as possible. It is an additional object to provide a simple and economical production method for the dispersions, i.e., a production method which does not involve a costly, time-consuming distillation stage and which does not involve the use of further components that have to be produced separately. It is another object of the present invention to provide dispersions that have solvent contents of less than 12% and can obtain the desired properties when prepared from raw materials which are readily available and which are as inexpensive as possible.

Surprisingly, these objects may be achieved with the specially selected copolymers of the present invention and the process for their production which are described hereinafter.

SUMMARY OF THE INVENTION

The present invention relates to aqueous solutions or dispersions of copolymers A) containing
 I) a hydroxy-functional, hydrophobic copolymer containing
  Ia) 30 to 85% by weight of (meth)acrylic acid esters having $C_1$ to $C_{18}$ hydrocarbon radicals in the alcohol portion, aromatic vinyl compounds and/or vinyl esters and
  Ib) 5 to 45% by weight of hydroxy-functional monomers,
 II) a hydroxy- and carboxy-functional, hydrophilic-hydrophobic copolymer containing
  IIa) 4 to 20% by weight of (meth)acrylic acid esters having $C_1$ to $C_{18}$ hydrocarbon radicals in the alcohol portion, aromatic vinyl compounds and/or vinyl esters, IIb) 4 to 15% by weight of hydroxy-functional monomers and IIc) 0.8 to 3.0% by weight of acid-functional monomers, and III) optionally a hydroxy-functional hydrophobic copolymer containing IIIa) 0 to 16% by weight of hydroxy- and/or non-functional (meth)acrylic acid esters or aromatic vinyl compounds, wherein
i) the preceding percentages are based on the total weight of components I), II) and III,
ii) the sum of Ia), Ib), IIa), IIb) IIc) and IIIa) is 100%, based on the weight of these components,
iii) copolymer A) has an acid number, based on solids, of 10 to 28 mg KOH/g substance,
iv) the weight percent of monomers IIc) in monomer II) is less than 25% by weight and
v) the weight percent of hydroxy-functional monomers IIb) in copolymer II) is higher than the weight percent of hydroxy-functional monomers Ib) in copolymer I).

The present invention also relates to a method of preparing aqueous dispersions or solutions of copolymers A) by a) free radically copolymerizing in a 70 to 95% organic solution a mixture of 30 to 85% by weight of monomers Ia) and 5 to 45% by weight of monomers Ib) to form a hydrophobic, hydroxy-functional copolymer I) which is essentially free from carboxyl groups, b) subsequently free radically copolymerizing 4 to 20% by weight of monomers IIa), 4 to 15% by weight of monomers IIb) and 0.8 to 3.0% by weight of monomers IIc) to form a hydrophilic-hydrophobic, hydroxy- and carboxy-functional copolymer II)

c) optionally subsequently free radically copolymerizing 0 to 16% by weight of monomers IIIa) to form a hydroxy-functional, hydrophobic copolymer III), d) neutralizing 70 to 130% of the carboxyl groups and e) dissolving or dispersing the copolymer A) in water, wherein the percentages of the monomers are selected such that copolymer A) contains 60 to 90% by weight of copolymer I) and 10 to 40% by weight of copolymer II).

Finally, the present invention relates to binder compositions containing 50 to 90% by weight of copolymers A) and 5 to 50% by weight of at least one crosslinking resin selected from aminoplast resins, blocked polyisocyanates and polyisocyanates containing free isocyanate groups, and to the use of these binders for preparing chemically crosslinked lacquers and coatings.

DETAILED DESCRIPTION OF THE INVENTION

Preferred are copolymers A) wherein
i) the weight percent of monomers IIa) in copolymer II) is 25 to 65% by weight,
ii) the weight percent of monomers IIb) in copolymer II) is 25 to 65% by weight,
iii) the weight percent of copolymer I) in copolymer mixture A) is 60 to 90% by weight, more preferably greater than 80 to 90% by weight,
iv) the weight percent of copolymer II) in copolymer mixture A) is 10 to 40% by weight, more preferably 10 to less than 20% by weight and
v) at least 70%, preferably at least 90%, of the carboxyl groups in copolymer A) are present in salt form.

More preferably, the weight percent of carboxyl-functional monomers IIc) in copolymer II) is 6 to 18% by weight and results in an acid number of 15 to 20 mg KOH/g substance. In addition, it is preferred that an excess of the neutralizing agent is present such that after converting all of the carboxyl groups into salt form, a pH of 7.9 to 10.0 is obtained.

Particularly preferred copolymers A) are those wherein copolymer I) contains

Ia) 40 to 80% by weight of (meth)acrylic acid esters having $C_1$ to $C_{18}$ aliphatic hydrocarbon radicals in the alcohol portion and/or aromatic vinyl compounds, Ib) 7.5 to 35% by weight of hydroxy-functional (meth) acrylic acid esters, copolymer II) contains IIa) 4 to 10% by weight of (meth)acrylic acid esters having g of $C_1$ to $C_{18}$ aliphatic hydrocarbon radicals in the alcohol portion and/or aromatic vinyl compounds, IIb) 6 to 12% by weight of hydroxy-functional (meth) acrylic acid esters, IIc) 1.5 to less than 2.5% by weight of acid-functional monomers, and copolymer III) contains IIIa) 0 to 16% by weight of hydroxy- and non-functional (meth)acrylic acid esters or aromatic vinyl compounds, wherein the carboxyl-functional monomers are used in amounts such that copolymer A) has an acid number, based on solids, of greater than 12 to less than 25 mg KOH/g substance results, and wherein greater than 90% of the carboxyl groups exist in salt form.

In another preferred embodiment copolymers A) contain an amount of less than 12% by weight of a solvent mixture of 30 to 95% by weight of a hydrophobic, water-immiscible, unsaponifiable solvent i) and 5 to 70% by weight of a water-miscible or water-soluble, unsaponifiable solvent ii).

It was surprising that the objectives of the present invention could be obtained without the presence of the hydroxy-functional polyethers which are described and employed in EP-A-758,007. The omission of these polyethers considerably simplifies the production of the dispersion according to the invention.

The fact these polyethers are not required is even more surprising when it is considered that copolymers A) are preferably prepared in a special solvent mixture containing 30 to 95% by weight, more preferably 50 to 85% by weight, of a hydrophobic, water-immiscible, unsaponifiable solvents i) and 5 to 70% by weight, more preferably 15 to 50% by weight, of water-miscible or water-soluble, unsaponifiable solvents ii).

Examples of hydrophobic, water-immiscible, unsaponifiable solvents i) include xylene, toluene, solvent naphtha and commercial hydrocarbon mixtures, such as Isopar solvent, Terapin solvent, crystal oil and white spirits. Examples of water-miscible or water-soluble, unsaponifiable solvents include butyl glycol, methoxy-propanol, butyl diglycol, diethylene glycol, dipropylene glycol, ethyl glycol, propyl glycol and methyl diglycol. The preparation of copolymers A) is preferably carried out in the absence of water, i.e., in organic solvents only.

It could not be predicted that it would be possible to prepare copolymers A) in this manner since DE-A-3,022,824, which describes water-thinnable copolymers, states that water-immiscible solvents impair the water-thinnability of the binder compositions. Therefore, this reference teaches away from the addition of these solvents. This is confirmed by the fact that none of the examples use any of the solvents i) described above.

Copolymers A) are prepared by initially copolymerizing monomers Ia) and Ib) to form a copolymer I), wherein the amount of copolymer I) in copolymer dispersion A) is 60 to 90, preferably greater than 80 to 90% by weight, and the proportion of copolymer II) in copolymer dispersion A) is 10 to 40, preferably 10 to less than 20% by weight.

Carboxyl-functional monomers are not used for the production of copolymer I). In order to achieve the objectives of the present invention, it is essential that hydrophobic copolymer I) is initially produced, that hydrophilic-hydrophobic copolymer II) is subsequently produced in situ, and that hydrophobic copolymer III) is optionally produced subsequently in situ.

Other procedures, e.g., initially producing a hydrophilic copolymer and then a hydrophobic copolymer, or producing portions of copolymers I) and II) alternately, or separately producing copolymers I) and II) and then mixing them, result in dispersions of poorer quality.

(Meth)acrylic acid esters Ia) are selected from those having linear or branched aliphatic hydrocarbon radicals with 1 to 18, preferably 1 to 8 carbon atoms. Examples of suitable monomers Ia) include ethyl acrylate, n-butyl acrylate, iso-butyl acrylate, 2-ethylhexyl acrylate, methyl methacrylate, styrene, vinyltoluene, ethyl methacrylate, butyl methacrylate, 2-ethylhexyl methacrylate, α-methylstyrene, and mixtures of these and other monomers. Vinyl esters can optionally be used in combination with these (meth)acrylic acid esters. The amount of monomers Ia) in copolymer A) is 30 to 85, preferably 40 to 80% by weight. Preferred monomers Ia) are styrene, methyl methacrylate, butyl methacrylate, butyl acrylate, 2-ethylhexyl-acrylate and mixtures of these monomers.

Examples of suitable hydroxy-functional monomers Ib) include hydroxyethyl methacrylate, hydroxypropyl methacrylate, hydroxyethyl acrylate, hydroxypropyl acrylate, hydroxybutyl acrylate and hydroxybutyl methacrylate. The amount of monomers Ib) in copolymer A) is 5 to 45, preferably 7.5 to 35% by weight. Preferred monomers Ib) are hydroxyethyl methacrylate, hydroxypropyl methacrylate, hydroxyethyl acrylate and hydroxypropyl acrylate.

Production of copolymer I) is carried out by a radical-initiated copolymerization of monomer mixture Ia) and Ib) in organic solution, preferably in the previously described solvent mixture. Suitable initiators include organic peroxides, such as di-tert.-butyl peroxide or tert.-butyl peroxy-2-ethylhexanoate, and azo compounds. The initiators are used in amounts of 0.5 to 6.5, preferably 2.0 to 4.5% by weight. The copolymerization is generally conducted at 90 to 180° C. as a monomer addition process.

Following the copolymerization of monomers Ia) and Ib) to form copolymer I), copolymerization of monomers IIa), IIb) and IIc) to form copolymer II) is carried out in the presence of copolymer I).

Suitable hydrophobic monomers IIa) are the monomers described under Ia). Preferred monomers IIa) are methyl methacrylate, butyl acrylate, styrene, butyl methacrylate, 2-ethylhexyl acrylate and mixtures of these monomers.

The amount of monomers IIa) in copolymer A) is 4 to 20, preferably 4 to 10% by weight. The amount of hydrophobic monomers IIa) in copolymer II) is 25 to 65, preferably 30 to 60% by weight.

Suitable monomers and preferred monomers IIb) are the monomers described under Ib). The amount of monomers Ib) in copolymer A) is 4 to 15, preferably 6 to 12% by weight. The amount of hydroxy-functional monomers IIb) in copolymer II) is 25 to 65, preferably 35 to 55% by weight, provided that the amount of hydroxy-functional monomers IIb) in copolymer II) must be higher than the amount of hydroxy-functional monomers Ib) in copolymer I). The amount (% by weight) of hydroxy-functional monomers IIb) in copolymer II) is preferably at least 25% higher, more preferably at least 50% higher, than the amount of hydroxy-functional monomers Ib) in copolymer I).

It has surprisingly been found that this increased proportion of crosslinking sites in copolymer II) results, even when there is a low content of hydroxyl groups, in advantageous properties of the resulting coatings, e.g., water and solvent resistance. This has a favorable economic effect on the binder compositions.

Examples of suitable monomers IIc) include acrylic acid, methacrylic acid, maleic acid (anhydride) and other carboxyl-functional copolymerizable monomers. Acrylic acid or methacrylic acid are preferred. The amount of monomers IIc) is 0.8 to 3.0, preferably 1.5 to less than 2.5% by weight. The amount of monomers IIc) in copolymer II) is less than 25, preferably 6 to 18% by weight, so that copolymer II) has a pronounced hydrophilic-hydrophobic character.

When a solvent mixture is used which contains at least one hydrophilic solvent that is not saponifiable and at least one hydrophobic, water-immiscible solvent which is not saponifiable, and when a degree of neutralization is used which is at least 70, preferably greater than 90%, this selected mixture of hydrophobic monomers, hydroxy-functional monomers, and hydrophilic carboxy-functional monomers in copolymer II) results in an excellent level of properties in the resulting coating.

The hydroxyl-functional monomers are used in amounts such that the theoretical hydroxyl number (OH no.), which can be calculated from the equation given below, of copolymer A), based on solids, is greater than 25 to less than 250, preferably greater than 50 to less than 175 mg KOH/g substance:

$$\text{OH no.} = \frac{\text{amount of hydroxyl monomer in 1000 g of } A) \times 56.1}{\text{molecular weight of hydroxyl monomer}}$$

The carboxyl-functional monomers are used in amounts such that the resulting theoretical acid number (acid no.), which can be calculated from the equation given below, of copolymer A), based on solids, is greater than 8 to less than 33, preferably greater than 12 to less than 25 and more preferably greater than 15 to less than 20 mg KOH/g substance:

$$\text{acid no.} = \frac{\text{amount of carboxyl monomer in 1000 g of } A) \times 56.1}{\text{molecular weight of carboxyl monomer}}$$

Following the in situ production of copolymer II), copolymerization of monomers IIIa) to form copolymer III) is optionally carried out in the presence of copolymers II) and I). The amount of copolymer III) in copolymer A) is less than 16% by weight, preferably 1 to 13% by weight.

Suitable hydrophobic monomers IIIa) include those described under Ia) and Ib), wherein a mixture of non-functional and hydroxy-functional monomers is preferred.

Organic amines or water-soluble inorganic bases can be used for the neutralization of the carboxyl groups which are incorporated into copolymer II). N-methylmorpholine, triethylamine, dimethylethanolamine, dimethylisopropanol-amine and methyl-diethanol-amine are preferred. Diethylethanolamine, butanolamine, morpholine, 2-aminomethyl-2-methyl-propanol and isophoronediamine are also suitable. Ammonia is less suitable, but can be used in combination with another neutralizing agent.

The neutralizing agent is added in amounts such that 70 to 130%, preferably more than 90% of the carboxyl groups are neutralized. The amount of neutralizing agent is preferably sufficient such that free neutralizing agent is still present after all of the carboxyl groups have been converted into salt form. This corresponds to a degree of neutralization of greater than 100%, which significantly improves, the stability of the dispersion, lacquer stability, pigment wetting and the visual properties of the resulting coatings.

The pH of the aqueous dispersion is 6.0 to 11.0, preferably 7.9 to 10.0. The solids content is greater than 35, preferably ≧40%.

The organic solvents are used in amounts such that the finished dispersion contains less than 12, preferably less than 9% by weight of solvent. At least a portion of the solvents may also be removed by distillation if particularly low contents of organic solvents are required.

Aqueous copolymers A) are used in or as lacquers or coating compositions in combination with crosslinking resins and optionally with pigments and other known additives from lacquer chemistry. Other binders or dispersions, e.g., those based on polyesters, polyurethanes, polyethers, polyepoxides or polyacrylates, may also be used.

The compositions contain 50 to 95, preferably 65 to 90% by weight of copolymers A), optionally in admixture with other binders or dispersions, and 5 to 50, preferably 10 to 35% by weight of crosslinking resins or mixtures of different crosslinking resins.

Examples of suitable crosslinking resins include amide- and amine-formaldehyde resins, phenolic resins, aldehyde and ketone resins (such as phenol-formaldehyde resins), resols, furan resins, urea resins, carbamic acid ester resins, triazine resins, melamine resins, benzo-guanamine resins, cyanamide resins and aniline resins, such as those described in "Lackkunstharze", by H. Wagner and H. F. Sarx, Carl Hanser Verlag Munich, 1971.

Also suitable as crosslinking resins are blocked polyisocyanates, for example, those based on isophorone diisocyanate, hexamethylene diisocyanate, 1,4-diisocyanato-cyclohexane bis-(4-isocyanatocyclohexyl)-methane and 1,3-diisocyanatobenzene; those based on lacquer polyisocyanates containing biuret or isocyanurate groups and prepared from 1,6-diisocyanatohexane, isophorone diisocyanate and bis-(4-isocyanatocyclohexyl)-methane; and those based on lacquer polyisocyanates containing urethane groups and prepared from 2,4- and/or 2,6-diisocyanatotoluene or isophorone diisocyanate and low molecular weight polyhydroxyl compounds such as trimethylolpropane, the isomeric propanediols or butanediols and mixtures of polyhydroxyl compounds of this type.

Examples of suitable blocking agents for these polyisocyanates include monohydric alcohols such as methanol, ethanol, butanol, hexanol, cyclohexanol or benzyl alcohol; oximes such as acetoxime or methyl ethyl ketoxime; lactams such as α-caprolactam; phenols, and amines such as diisopropylamine or dimethylpyrazole.

The hydrophilic modification of copolymer component A) is generally sufficient to ensure the dispersibility of the crosslinking resins if these resins are not soluble or dispersible in water. Blocked polyisocyanates which are soluble or dispersible in water can be obtained, for example, by modification with carboxylate and/or polyethylene oxide groups.

Also suitable as crosslinking resins are low viscosity, hydrophobic or hydrophilic polyisocyanates which contain free isocyanate groups and which are based on aliphatic, cycloaliphatic, araliphatic and/or aromatic isocyanates. These polyisocyanates generally have a viscosity at 23° C. of 10 to 3500 mPa.s. If necessary, the polyisocyanates can be used in admixture with small amounts of inert solvents in order to reduce the viscosity to a value within this range.

These polyisocyanates can be rendered hydrophilic, for example, by reaction with sub-stoichiometric amounts of monohydric, hydrophilic polyether alcohols. The preparation of hydrophilic polyisocyanates of this type is described in EP-A-540,985 for example. It is also possible to impart hydrophilic properties to polyisocyanates by the addition of commercially available emulsifiers.

Mixtures of different crosslinking resins can also be used in accordance with the present invention.

In one preferred embodiment, mixtures of a hydrophilic polyisocyanate and a low viscosity, hydrophobic polyisocyanate are used in combination with the dispersions according to the invention in aqueous two-component systems which are reactive at room temperature. Preferred mixtures are those containing 30 to 90% by weight of a hydrophilic polyisocyanate based on hexamethylene diisocyanate and 10 to 70% by weight of a hydrophobic polyisocyanate based on hexamethylene diisocyanate, isophorone diisocyanate and/or bis-(4-isocyanatocyclohexyl)-methane. Also preferred are mixtures containing 10 to 65% by weight of a low viscosity hydrophobic polyisocyanate based on hexamethylene diisocyanate and containing isocyanurate, biuret, allophanate and/or uretdione groups and 35 to 90% by weight of a hydrophilic polyisocyanate based on isophorone diisocyanate.

The term "low viscosity" means viscosities of 10 to 1500 mPa.s at 23° C.

In another preferred embodiment, mixtures of hydrophilic polyisocyanates containing free isocyanate groups and amino crosslinking resins, which preferably do not contain free amino groups, are combined with copolymers dispersions A) and are cured, preferably at temperatures of 60 to 120° C. These mixtures preferably contain 25 to 68% by weight of polyisocyanates containing free isocyanate groups and 32 to 75% by weight of amino crosslinking resins.

The known additives from lacquer technology can be added by mixing the individual components before, during or after the production of the aqueous binder combinations, even when the coating compositions are intended to be processed as one-component systems. Examples of these additives include anti-foaming agents, thickeners, pigments, dispersing agents, catalysts, anti-skinning agents, anti-settling agents and emulsifiers.

The coating compositions according to the invention are suitable for all fields of application in which aqueous paint, varnish and coating compositions requiring a high level of properties are employed, e.g., coatings for mineral-based building surfaces, coatings and sealants for wood and timber-based products, coatings for metal surfaces, coverings and coatings for roads based on asphalt or bitumen, and coatings and sealants for plastics.

The lacquers or coating media which are produced using the binder vehicle combinations according to the invention include primers, primer surfacers and pigmented or transparent covering lacquers, as well as single-coat lacquers which can be employed for one-off and mass-production applications, e.g. in the field of industrial lacquer coating, for the original lacquer coating of automobiles and the lacquer coating thereof for repair purposes.

The aqueous copolymers A) according to the invention are preferably used in combination with polyisocyanates and most preferably in combination with mixtures of hydrophilic and hydrophobic polyisocyanates for coating metal surfaces or plastics at temperatures from room temperature to 140° C., or in combination with amino crosslinking resins for coating of metal surfaces at 110 to 180° C., in the form of single-layer coatings or as covering lacquers.

The coating compositions can be applied by various spraying processes, such as compressed air, airless or electrostatic spraying processes, using one- or optionally two-component spraying installations. The lacquers and coating compositions can also be applied by other methods, for example, by brushing, rolling or by doctor blades.

EXAMPLES

Example 1

253 g of solvent naphtha and 88 g of butyl glycol were placed in a 6 liter reaction vessel fitted with a stirrer, condenser and heater and were heated to 155° C. Mixture I), containing 125 g of styrene, 125 g of methyl methacrylate, 720 g of butyl acrylate, 275 g of butyl methacrylate and 765 g of hydroxypropyl methacrylate, was then added over 3 hours. Afterwards mixture II), containing 75 g of butyl acrylate, 185 g of hydroxypropyl methacrylate, 25 g of methyl methacrylate, 13 g of butyl methacrylate and 56 g of acrylic acid, was added over 1.5 hours. Beginning with the addition of mixture I), 98 g of di-tert.-butyl peroxide in 100 g of solvent naphtha were added over 5 hours. After stirring for a further 2 hours at 145° C., the batch was cooled to 100° C., 71 g of dimethylethanolamine were added and the product was dispersed in 2500 g of distilled water. An aqueous dispersion of copolymer A1) was obtained which had a solids content of 45%, an acid number of 18.5 (100% solids) and an OH number of 155 (100% solids).

Example 2

151 g of butyl glycol and 221 g of solvent naphtha were weighed into a 6 liter reaction vessel fitted with a stirrer, condenser and heater and were heated to 145° C. Mixture I), containing 915 g of methyl methacrylate, 603 g of butyl methacrylate and 445 g of hydroxyethyl methacrylate was then added over 3 hours. Afterwards mixture II), containing 143 g of methyl methacrylate, 85 g of butyl acrylate, 163 g of hydroxyethyl methacrylate and 60 g of acrylic acid, was added over 1.5 hours. Beginning with the addition of mixture I), 87.5 g of di-tert.-butyl peroxide and 70 g of butyl glycol were added over 5 hours. After stirring for a further 2 hours at 45° C., the batch was cooled to 100° C., 78 g of dimethylethanolamine were added (degree of neutralization 105%) and the product was dispersed in 2800 g of distilled water. Aqueous copolymer A2) was obtained which had a solids content of 43%, an acid number of 19.3 (100% solids) and an OH number of 109 (100% solids).

The amount of copolymer I) in copolymer A2) was 81.32%, and the amount copolymer II) was 18.68%. Copolymer II) contained 50.55% by weight of hydrophobic monomers IIa), 36.14% by weight of hydroxy-functional monomers IIb) and 13.30% by weight of carboxyl-functional monomers IIc). The content of carboxyl-functional monomers in copolymer A2) was 2.48% by weight and the content of hydroxy-functional monomers in copolymer II) was 59.48% higher than in copolymer I).

Example 3

186 g of butyl glycol and 186 g of solvent naphtha were weighed into a 6 liter reaction vessel fitted with a stirrer, condenser and heater and were heated to 143° C. Mixture I), containing 750 g of methyl methacrylate, 125 g of styrene, 445 g of hydroxyethyl methacrylate, 538 g of butyl acrylate and 87 g of butyl methacrylate, was then added over 3 hours. Afterwards mixture II), containing 128 g of methyl methacrylate, 180 g of hydroxyethyl methacrylate, 100 g of butyl acrylate and 60 g of acrylic acid, was added over 1.5 hours. Beginning with the addition of mixture I), 88 g of di-tert.-butyl peroxide in 70 g of a 1:1 mixture of butyl glycol and solvent naphtha were added over 5 hours. After stirring for a further 2 hours at 145° C., the batch was cooled to 100° C., 76 g of dimethylethanolamine were added and the product was dispersed in 2700 g of distilled water. Aqueous copolymer A3) was obtained which had a solids content of 44%, a viscosity of about 800 mPa.s (23° C., shear rate $40^{-1}$), a pH (10% in water) of 8.1 and a degree of neutralization of 105%. Because the dispersion could readily be filtered and was finely divided (average particle size about 105 nm), it was very suitable for high-quality lacquer applications.

Comparison Example 4

Example 3 was repeated with the exception that monomer mixtures I) and II) were added simultaneously. After adding a neutralizing agent and water, an unstable dispersion containing extremely coarse particles was obtained, which rapidly separated into two-phases and was unsuitable for lacquer applications.

Comparison Example 5

Example 3 was repeated with the exception that monomer mixtures I) and II) were added simultaneously and the amount of acrylic acid was doubled with a corresponding reduction of the amount of methyl methacrylate. After adding a neutralizing agent (degree of neutralization 105%) and water, a stable dispersion was obtained. However, the solids content was only 31%. The acid number was 39 (100% solids) and the OH number was 109 (100% solids).

When the dispersion obtained in comparison example 5 was used in application example 10, a significantly reduced lacquer solids content was obtained (44% instead of 53%). The defect-free coating thickness which could be obtained was significantly less, and the visual properties of the film such as gloss were considerably reduced (20°/60° gloss: 52/78 as opposed to 74/95 when dispersion A3) was used).

When the dispersion obtained in comparison example 5 was used in application example 11, a reduced pot life was obtained (about 4 hours instead of greater than 6 hours when using dispersion A3)). When the dispersion from comparison example 5 was used, the water resistance of the dried film was reduced compared with dispersion A3), i.e., after contact for 72 hours with a cotton swab saturated with water, white runs and the commencement of softening of the film were discernible, while no change could be identified for films based on dispersion A3)).

Comparison Example 6

Example 3 was repeated with the exception that hydrophilic-hydrophobic monomer mixture II) was added first, followed by hydrophobic monomer mixture I). A copolymer dispersed in water was obtained, which had a solids content of 36%, an acid number of 19.2 (100% solids), an OH number of 109 (100% solids), a pH (10% in water) of 8.1 and a degree of neutralization of 105%. The dispersion contained coarse particles (average particle size about 250 nm), could only be filtered with difficulty and had a significantly lower solids content. When the dispersion was used in coating compositions, coatings were obtained which had a lower solids content and which exhibited significantly reduced gloss values compared with the dispersion according to example 3). In addition, the compatibility with some crosslinking resins was reduced, and films and coatings were obtained which were dull in parts.

The following crosslinking resins were used in the application examples:

Polyisocyanate I

A low viscosity hydrophobic polyisocyanate containing isocyanurate groups and based on hexamethylene diisocyanate, viscosity at 23° C.: about 1200 mPa.s, NCO content: about 23.5%.

Amino crosslinking resin II

Cymel 327 (Cytec); a commercially available melamine resin

Polyisocyanate III

A hydrophilic modified polyisocyanate containing free isocyanate groups, based on hexamethylene diisocyanate isocyanurate and a monohydroxy functional polyethylen glycol polyether, viscosity at 23° C.: about 3500 mPa.s, NCO content: about 17%.

Polyisocyanate IV

A hydrophilic modified polyisocyanate containing free isocyanate groups and based on isophorone diisocyanate isocyanurate and a monohydroxy functional polyethylen glycol polyether, present as a 70% solution in methoxypropyl acetate/xylene (1:1), viscosity at 23° C.: about 500 mPa.s, NCO content: about 9.5%.

Polyisocyanate V

A 40% aqueous dispersion of a blocked polyisocyanate crosslinking agent based on hexamethylendiisocyanate isocyanurate, containing butanone oxime as blocking agent (BayhydurBL 5140, Bayer).

Application Example 7

142 g of dispersion A1) was diluted with 33 g of water (component A) and was mixed by means of a dissolver with component B) which contained 45 g of polyisocyanate crosslinking agent 1, 4.4 g of Tinuvin 1130 (50% solution in butyl glycol acetate; Ciba Geigy), 2.2 g of Tinuvin 292 (50% solution in butyl glycol acetate; Ciba Geigy), 1.1 g of Baysilon OL 44 (10% solution in butyl glycol acetate; Bayer) and 22.8 g of butyl diglycol acetate.

The resulting two-component polyurethane composition had a solids content of 45%, an NCO:OH equivalent ratio of about 1.5:1, and a pot life of greater than 6 hours, during which the viscosity remained approximately constant.

The clear lacquer was applied to an aluminum sheet and to a glass plate by spray application. After pre-drying for 10 minutes at 80° C., the coating was hardened for 30 minutes at 130° C. The following properties of the dried film were measured:

| | |
|---|---|
| gloss (Gardner 20°): | 85 |
| DOI value: | 90 |
| resistance to solvents[1]: | 0/0/0/3 |
| resistance to water: | very good |
| resistance to 2% sulphuric acid: | very good |
| water of condensation test (DIN 50017) 244 hours: | very good |

[1]Exposure to xylene/ethoxypropyl acetate/ethyl acetate/acetone for 1 minute.
Subsequent assessment of the films: 0 = no change (best value) to 5 = detached (worst value).

Application Example 8

254 g of dispersion A2), 42 g of water and 170 g of titanium dioxide (Bayertitan R-KB-4, Bayer) were ground and mixed by means of a dissolver with 1.1 g of a commercially available thickener, 15.4 g of polyisocyanate crosslinking agent I) and 20.3 g of an 80% solution of polyisocyanate crosslinking agent III) in methoxypropyl acetate. The product was subsequently thinned with water to a viscosity of 28 seconds in a DIN 4 cup; the solids content of the coating composition was then about 52%. The pot life of the coating composition was about 6 hours.

After application, the coating was dust-dry in 30 minutes, tack-free after 2 hours 30 minutes and formed high-gloss films. The mechanical properties after hardening were very good (pendulum hardness 120 sec, cupping index greater than 9 mm). The adhesion to steel panels was excellent, as was the resistance to xylene and acetone. When a "wedge" was prepared, i.e. a film of increasing thickness, the boundary of bubble formation was greater than 140 µm, which means that very high thicknesses were obtained without film defects. Therefore, even objects that cannot usually be coated, e.g., because excessively high coating thicknesses are obtained due to overlap during spray application, can be reliably coated.

Application Example 9

56.9 g of dispersion A1), 12.8 g of an amino crosslinking resin II, 0.8 g of Tinuvin (50% solution in butyl diglycol; Ciba Geigy), 1.5 g of Tinuvin 11:30 (50% solution in butyl diglycol; Ciba Geigy), 1 g of Baysilon OL 44 (10% solution in butyl diglycol, Bayer) 0.3 g of Byk 333 (25% solution in water, Byk Chemie) and 0.2 g of Byk 345 (Byk Chemie) were mixed and adjusted to a solids content of 40%. The clear coating composition was applied to degreased metal panels, and after pre-drying for 10 minutes at 60° C. was stoved for 20 minutes at 160° C.

A clear, high-gloss coating film (Gardner 20° gloss: 89; DOI: 100) was obtained which exhibited very good mechanical properties (König pendulum hardness—DIN 53157: 192 seconds, cupping index—DIN 53156: 6 mm) and very good chemical resistance when exposed to tree gum, brake fluid, pancreatic juice and caustic soda.

Application Example 10

350 g of dispersion A3), 8 g of Surfynol 104 (Air products), 48 g of water and 300 g of titanium dioxide (Bayertitan R-KB-4, Bayer) were ground in a shaker. The ground material was mixed with 30 g of dispersion A3), 33 g of amino crosslinking resin II, 160 g of polyisocyanate crosslinking agent V, 6 g of Acrysol RM8 (a 20% solution in ethanol, Rohm & Haas) and 10 g of Byk 011 (Byk Chemie) and was adjusted with water to a viscosity of about 30 seconds at 23° C. in a DIN 4 flow cup. The solids content of the coating composition was about 53%. After application to a degreased steel panel, the coating compositions were stoved for 20 minutes at 160° C. The dry coat thickness was about 35 µm. The 200/600 gloss was 74/95. The mechanical properties were very good (cupping indentation 6 mm, pendulum hardness 148 seconds). The resistance to solvents (rubbing test with a cotton swab impregnated with methyl ethyl ketone, 100 double rubs without any result) was very good. The shelf life was greater than 6 months.

Application Example 11

Dispersion A3) was mixed with a 1:1 mixture of polyisocyanate crosslinking agents I) and IV) in a dissolver and was adjusted with water to a viscosity of about 30 seconds in a DIN 4 flow cup. The selected NCO:OH equivalent ratio was 1.4:1. The pot life of the mixture was more than 6 hours. A coating was applied to a glass plate and hardened at room temperature. The dry coat thickness was about 45 µm. The coating had a high gloss (Gardner 20° gloss: 82) and dried in about 3 hours to give a clear, tack-free coating. The pendulum hardness was 95 seconds after one day, and was 130 seconds after 7 days. The resistance to acetone and xylene was very good, as was the resistance to water.

Example 12

186 g of solvent naphtha and 186 g of butyl glycol were placed in a 6 liter reaction vessel fitted with a stirrer, condenser and heater and were heated to 143° C. Mixture I), containing 750 g of methyl methacrylate, 125 g of styrene, 415 g of hydroxyethyl methacrylate, 493 g of butyl acrylate and 87 g of butyl methacrylate, was then added over 3 hours. Afterwards mixture II), containing 128 g of methyl methacrylate, 180 g of hydroxyethyl methacrylate, 100 g of butyl acrylate and 60 g of acrylic acid, was added over 1.5 hours. Afterwards mixture III), containing 30 g of hydroxyethyl methacrylate and 45 g of butyl acrylate was added over 15 minutes. Beginning with the addition of mixture I), a solution of 88 g of di-tert. butyl peroxide in 35 g of butyl glycol and 35 g of solvent naphtha was added over 5 hours. After stirring for a further 2 hours at 143° C. the batch was cooled to 100° C., 76 g of dimethyl-ethanolamine were added and the product was dispersed in 2500 g of water. Aqueous copolymer A12) was obtained which had a solids content of 45%, an acid number of 18.9 (100% solids) and an OH number of 109 (100% solids).

After hardening, coatings produced using copolymer A12) exhibited the same good properties as those of copolymer A3), the overall monomer composition of which was identical; however, the viscosity of copolymer A12) was more stable during storage. Even after storage for an extended period, the dispersion exhibited no change in viscosity, while copolymer A3) exhibited slight variations in viscosity. These variations are known for many dispersions, but do not have a negative effect on coating properties.

Comparison Example 13

Example 3 was repeated with the exception that methoxypropyl acetate was used instead of solvent naphtha or butyl glycol.

The resulting aqueous copolymer A13) contained many bubbles and gel particles, could not be filtered, thus, was unsuitable for higher quality coating applications. In addition, during storage at 50° C. a considerable increase in acid number was observed, which was due to the saponification of the methoxypropyl acetate solvent. This resulted in a decrease of pH and impaired the properties of lacquers and coatings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous solution or dispersion of a copolymer mixture A) comprising:
   I) a hydroxy-functional, hydrophobic, copolymer which is free of carboxyl groups and is polymerized from monomers comprising:
      Ia) 30 to 85% by weight of a (meth)acrylic acid ester having $C_1$–$C_{18}$ hydrocarbon radicals in the alcohol portion, an aromatic vinyl compound and/or a vinyl ester; and
      Ib) 5 to 45% by weight of hydroxy-functional monomers;
   II) a hydroxy- and carboxy-functional, hydrophilic-hydrophobic copolymer polymerized from monomers comprising:
      IIa) 4 to 20% by weight of a (meth)acrylic acid ester having $C_1$–$C_{18}$ hydrocarbon radicals in the alcohol portion, an aromatic vinyl compound and/or a vinyl ester;
      IIb) 4 to 15% by weight of a hydroxy-functional monomer; and
      IIc) 0.8 to 3.0% by weight of an acid-functional monomer; and
   III) optionally a hydroxy-functional hydrophobic copolymer polymerized from monomers comprising:
      IIIa) 0 to 16% by weight of a hydroxy- and/or non-functional (meth)acrylic acid ester or an aromatic vinyl compound;
   wherein
   i) the preceding percentages are based on the total weight of components I), II) and III;
      ii) the sum of Ia), Ib), IIa), IIb) IIc) and IIIa) is 100%, based on the weight of these components;
      iii) copolymer mixture A) has an acid number, based on solids, of 10 to 28 mg KOH/g substance;
      iv) the weight percent of monomer IIc) in the monomers used to polymerize copolymer II) is less than 25% by weight;
      v) the weight percent of hydroxy-functional monomer IIb) in the monomers used to polymerize copolymer II) is higher than the weight percent of hydroxy-functional monomer Ib) in the monomers used to polymerize copolymer I); and
      vi) the copolymer mixture is free of hydroxy-functional polyethers.

2. The aqueous solution or dispersion of copolymer mixture A) of claim 1 wherein
   i) the weight percent of monomers IIa) in the monomers used to polymerize copolymer II) is 25 to 65% by weight,
   ii) the weight percent of monomers IIb) in the monomers used to polymerize copolymer II) is 25 to 65% by weight,
   iii) the weight percent of copolymer I) in copolymers A) is 60 to 90% by weight, iv) the weight percent of copolymer II) in copolymers A) is 10 to 40% by weight and v) at least 70% of the carboxyl groups in copolymer mixture A) are present in salt form.

3. The aqueous solution or dispersion of copolymer mixture A) of claim 1 wherein the monomers used to polymerize copolymer I) comprise Ia) 40 to 80% by weight of a (meth)acrylic acid ester having $C_1$ to $C_{18}$ aliphatic hydrocarbon radicals in the alcohol portion and/or an aromatic vinyl compound, and Ib) 7.5 to 35% by weight of a hydroxy-functional (meth) acrylic acid ester; the monomers used to polymerize copolymer II) comprise IIa) 4 to 10% by weight of a (meth)acrylic acid ester having $C_1$ to $C_{18}$ aliphatic hydrocarbon radicals in the alcohol portion and/or an aromatic vinyl compound, IIb) 6 to 12% by weight of a hydroxy-functional (meth) acrylic acid ester, and IIc) 1.5 to less than 2.5% by weight of an acid-functional monomer; and the monomers used to polymerize copolymer III) comprise IIIa) 0 to 16% by weight of hydroxy- and non-functional (meth)acrylic acid esters or aromatic vinyl compounds; wherein the carboxyl-functional monomers are used in amounts such that copolymer mixture A) has an acid number, based on solids, of greater than 12 to less than 25 mg KOH/g substance, and wherein greater than 90% of the carboxyl groups exist in salt form.

4. The aqueous solution or dispersion of copolymer mixture A) of claim 1 wherein i) the weight percent of copolymer I) in copolymer mixture A) is greater than 80 to 90% by weight, ii) the weight percent of copolymer II) in the copolymer mixture A) is 10 to less than 20% by weight, iii) the weight percent carboxyl-functional monomer IIc) in the monomers used to polymerize copolymer II) is 6 to 18% by weight, iv) copolymers A) have an acid number, based on solids, of 15 to 20 mg KOH/g substance and v) 100% of the carboxyl groups in copolymer mixture A) are present in salt form and sufficient additional neutralizing agent is present such that the copolymer mixture A) has a pH of 7.9 to 10.0.

5. The aqueous solution or dispersion of copolymer mixture A) of claim 1 which contains up to 12% by weight, based on the weight of the aqueous solution or dispersion of copolymer mixture A), of a solvent mixture comprising 30 to 95% by weight of a hydrophobic, water-immiscible, unsaponifiable solvent i) and 5 to 70% by weight of a water-miscible or water-soluble, unsaponifiable solvent ii).

6. The aqueous solution or dispersion of copolymer mixture A) of claim 1 which contains up to 9% by weight, based on the weight of the aqueous solution or dispersion of copolymer mixture A), of a solvent mixture comprising 50 to 85% by weight of a hydrophobic, water-immiscible, unsaponifiable solvent i) and 15 to 50% by weight of a water-miscible or water-soluble, unsaponifiable solvent ii).

7. The aqueous solution or dispersion of copolymer mixture A) of claim 1 wherein the weight percent of copolymer III) in copolymer mixture A) is 3 to 13% by weight.

8. An aqueous binder composition comprising 50 to 95% by weight of the aqueous solution or dispersion of copolymer mixture A) of claim 1 and 5% to 50% by weight of a hydrophilic blocked polyisocyanate.

9. An aqueous binder composition comprising 50 to 95% by weight of the aqueous solution or dispersion of copolymer mixture A) of claim 1 and 5% to 50% by weight of a of a mixture of an aminoplast resin, a hydrophilic blocked polyisocyanate and/or a hydrophobic blocked polyisocyanate.

10. An aqueous binder composition comprising 50 to 95% by weight of the aqueous solution or dispersion of copolymer mixture A) of claim 1 and 5% to 50% by weight of a hydrophilic polyisocyanate containing free isocyanate groups.

11. An aqueous binder composition comprising 50 to 95% by weight of the aqueous solution or dispersion of copolymer mixture A) of claim 1 and 5% to 50% by weight of a mixture of a hydrophobic or hydrophilic polyisocyanate containing free isocyanate groups and an amino crosslinking resin.

* * * * *